(12) United States Patent
Becker et al.

(10) Patent No.: US 9,073,387 B2
(45) Date of Patent: Jul. 7, 2015

(54) DEVICE FOR SECURING A WHEEL NUT ON A WHEEL HUB OF A MOTOR VEHICLE

(75) Inventors: Dietmar Becker, Tamm (DE); Marco Ujhasi, Leonberg (DE); Friedrich Feicha, Weingarten (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 447 days.

(21) Appl. No.: 13/546,512

(22) Filed: Jul. 11, 2012

(65) Prior Publication Data
US 2013/0020855 A1    Jan. 24, 2013

(30) Foreign Application Priority Data
Jul. 20, 2011    (DE) .......................... 10 2011 051 979

(51) Int. Cl.
*B60B 25/00*   (2006.01)
*B60B 3/14*    (2006.01)
*B60B 3/16*    (2006.01)

(52) U.S. Cl.
CPC ............... *B60B 3/142* (2013.01); *B60B 3/165* (2013.01); *B60B 2900/325* (2013.01)

(58) Field of Classification Search
CPC ........ B60B 37/10; B60B 27/00; B60B 27/02; B60B 3/142; B60B 7/066
USPC .......... 301/111.01, 115, 122, 11.03, 301/108.4–108.5, 35.63, 35.55
See application file for complete search history.

(56) References Cited

U.S. PATENT DOCUMENTS

| 650,316 | A | * | 5/1900 | Hamer | 301/115 |
| 687,857 | A | * | 12/1901 | Seuffert | 301/115 |
| 703,643 | A | * | 7/1902 | Davidson | 301/115 |
| 5,054,859 | A | * | 10/1991 | Goettker | 301/108.1 |
| 5,211,448 | A | | 5/1993 | Hayashi | |
| 5,431,485 | A | * | 7/1995 | Hayashi | 301/35.55 |
| 6,758,531 | B1 | * | 7/2004 | Bullard | 301/37.21 |
| 6,983,999 | B2 | * | 1/2006 | Goettker | 301/108.4 |

FOREIGN PATENT DOCUMENTS

| DE | 666703 | 10/1938 |
| DE | 4205579 A1 | 8/1993 |
| DE | 29823594 U1 | 8/1999 |
| DE | 20 2009 002 215 U1 | 10/2010 |
| JP | 10217701 A | 8/1998 |
| WO | WO 2011/124407 A1 | 10/2011 |

OTHER PUBLICATIONS

German Search Report, dated Feb. 29, 2012, with partial English translation.

* cited by examiner

*Primary Examiner* — Jason Bellinger
(74) *Attorney, Agent, or Firm* — RatnerPrestia

(57) ABSTRACT

A device for securing a wheel nut on a wheel hub of a motor vehicle, in particular a wheel nut of a center lock on a motor vehicle wheel, wherein the device is designed in the manner of a securing cover, and wherein the securing cover has a cylindrical flange region, which rests at least over a certain area on the end of the hollow axle stub, and a cylindrical extension, which extends from the flange region in the direction of the axle stub, is provided with an external thread and interacts with an internal thread arranged in the hollow axle stub of the wheel hub.

9 Claims, 2 Drawing Sheets

DEVICE FOR SECURING A WHEEL NUT ON A WHEEL HUB OF A MOTOR VEHICLE

CROSS-REFERENCE TO RELATED APPLICATIONS

Figure 1:
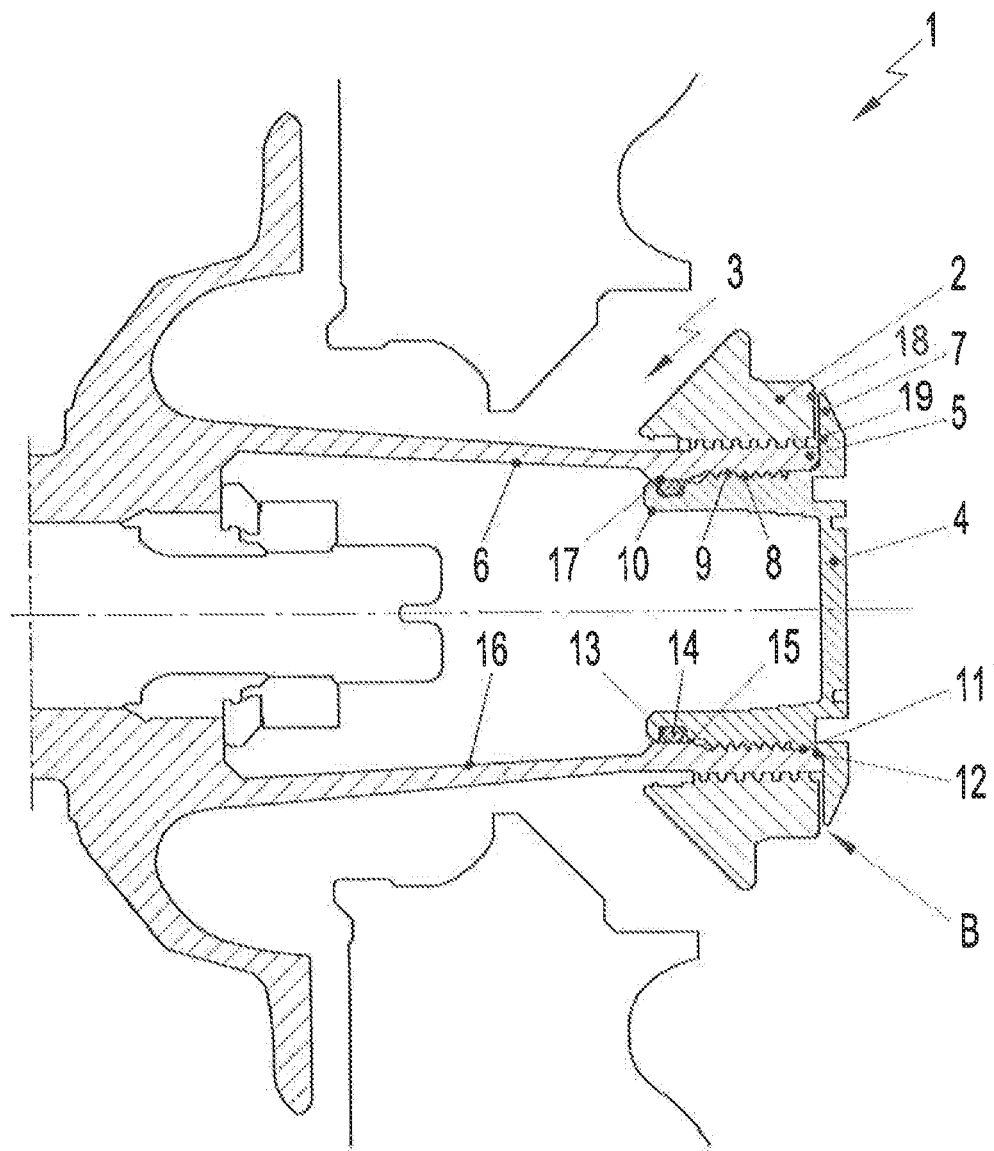

This U.S. patent application claims priority to German Patent application DE102011051979.3, filed Jul. 20, 2011, which is incorporated by reference herein in its entirety.

FIELD OF THE INVENTION

The invention relates to a device for securing a wheel nut on a wheel hub of a motor vehicle, in particular a wheel nut of a center lock on a motor vehicle wheel.

BACKGROUND OF THE INVENTION

DE 298 23 594 U1, which is incorporated by reference herein, discloses a device for securing a wheel nut on a wheel hub of a motor vehicle, in particular a wheel nut of a center lock on a motor vehicle wheel, wherein a locking pin is held in a longitudinally displaceable manner in a cylindrical sleeve subject to loading by a spring in the axle stub of a wheel hub, and the sleeve can be adjusted from a retaining position of the wheel nut into an unlocking position by means of an assembly tool.

SUMMARY OF THE INVENTION

Disclosed herein is a device for securing a wheel nut of a center lock, which device is, in particular, simplified in terms of its design configuration and reliably prevents release of the wheel nut from the wheel hub.

More particularly, disclosed herein is a device for securing a wheel nut on a wheel hub of a motor vehicle, in particular a wheel nut of a center lock on a motor vehicle wheel, wherein the device is designed in the manner of a securing cover, wherein the securing cover has a cylindrical flange region, which rests at least over a certain area on the end of the hollow axle stub, and a cylindrical extension, which extends from the flange region in the direction of the axle stub, is provided with an external thread and interacts with an internal thread arranged in the hollow axle stub of the wheel hub.

The device is designed in the manner of a securing cover, wherein the securing cover has a cylindrical flange region, which rests at least over a certain area on the end of the hollow axle stub, and a cylindrical extension, which extends from the flange region in the direction of the axle stub, is provided with an external thread and interacts with an internal thread arranged in the hollow axle stub of the wheel hub. The principal advantages that can be achieved with the invention consist in that both the axle stub and the wheel nut (center lock) can be made shorter in terms of the axial longitudinal extent thereof through using the securing cover, since the securing means, such as cotter pins or locking pins or the like, which are generally provided on the axle stub, can be omitted.

One embodiment envisages that at least one thread-free outer surface extends on the extension, interacting as a stabilizing surface with a thread-free inner surface of the hollow axle stub. This is advantageous particularly in the case of axle stubs which are of thin construction since deformation of the axle stub may occur due to tightening torques or load torques in the region of the wheel nut or in the region of the securing cover.

By way of example, the stabilizing surface can be designed as an uninterrupted circumferential surface, which extends at least a short distance on the extension in the direction of the axle stub, preferably starting from the flange region.

A connecting arrangement designed as a transition fit is preferably formed between the thread-free outer surface of the extension and the thread-free inner surface of the axle stub. The provision of a transition fit makes it possible to achieve particularly reliable stabilization of the hollow axle stub by means of the securing cover.

Another embodiment envisages that at least one sealing element, in particular an O-ring, arranged in a corresponding recess, is provided on the circumferential surface of the extension. The recess is designed in such a way that the O-ring protrudes at least slightly from the recess in order to ensure particularly reliable sealing, especially with respect to spray or dirt.

Provision can furthermore be made for the sealing element to assume a securing function, in the sense of fixing the position of the securing cover, in addition to the sealing function. In other words, the sealing element prevents the securing cover from being unscrewed from or sliding out of the axle stub.

By way of example, the sealing element can be arranged in a contact region of smaller diameter than the diameter of the stabilizing surface.

A preferred embodiment envisages that a bearing surface, which projects inward at least over a certain area, is provided on the inner surface of the hollow axle stub, wherein the sealing element comes to rest in the region of the bearing surface, and wherein the inside diameter of the bearing surface is at least slightly greater than the outside diameter of the contact region assigned to the sealing element.

Here too, provision can additionally be made for the contact region to interact as a stabilizing surface with the bearing surface.

The device is designed in such a way that, in the installed condition, there is at least a slight spacing between the inner surface of the flange, which faces the axle stub, and the outer end of the wheel nut, which faces the inner surface. By means of this at least slight spacing, unwanted material stresses due to scratching or scraping are prevented in the region of the flange.

Further important features and advantages of the invention will emerge from the dependent claims, from the drawings and from the associated description of the figures with reference to the drawings.

It goes without saying that the features mentioned above and those which will be explained below can be used not only in the respectively indicated combination but also in other combinations or in isolation without exceeding the scope of the present invention.

BRIEF DESCRIPTION OF THE DRAWING FIGURES

An illustrative embodiment of the invention is shown in the drawings and is explained in greater detail in the following description, in which the same reference signs refer to components which are the same or similar or have the same function.

Figure 2:
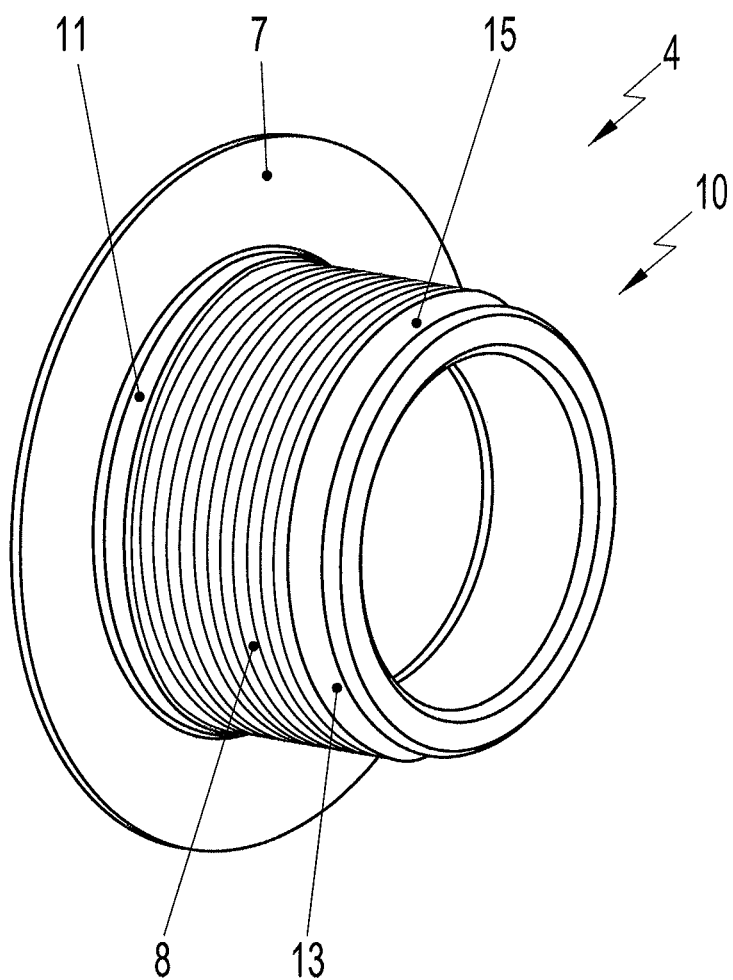

In the drawing, in which the figures are each schematic,

FIG. 1 shows an installed device for securing a wheel nut on a wheel hub of a motor vehicle, and FIG. 2 shows the device in accordance with FIG. 1 in isolation.

DETAILED DESCRIPTION OF THE DRAWING FIGURES

FIG. 1 shows a device 1 for securing a wheel nut 2 on a wheel hub 3 of a motor vehicle, in particular a wheel nut of a center lock on a motor vehicle wheel. The device 1 is designed as a securing cover 4, wherein the securing cover 4 has a cylindrical flange region 7, which rests at least over a certain area on the end 5 of the hollow axle stub 6, and a cylindrical extension 10, which extends from the flange region 7 in the direction of the axle stub 6, is provided with an external thread 8 and interacts with an internal thread 9 arranged in the hollow axle stub 6 of the wheel hub 3.

Also visible is the thread-free outer surface 11 extending on the extension 10, which interacts as a stabilizing surface with the thread-free inner surface 12 of the hollow axle stub 6. In the event of excessive tightening torques or unforeseen load torques, the stabilizing surface on the securing cover 4 prevents deformation of the hollow axle stub 6 of the wheel hub 3. A sealing element 14 arranged in a recess 13 is furthermore provided on the circumferential surface of the extension 10, wherein the sealing element 14 is designed in the manner of an O-ring. In addition to the sealing function, the O-ring assumes a securing function, in the sense of fixing the position of the securing cover 4 within the hollow axle stub 6. This prevents the securing cover 4 being lost or released from the axle stub 6 due to shocks or the like. The sealing element 14 is arranged in a contact region 15 of smaller diameter than the diameter of the stabilizing surface.

A bearing surface 17, which projects inward, is provided on the inner surface 16 of the hollow axle stub 6, wherein the inside diameter of the bearing surface 17 is at least slightly greater than the outside diameter of the contact region 15 assigned to the sealing element 14. By way of example, it is possible in this case too to provide for the contact region 15 to interact as a further stabilizing surface with the bearing surface 17.

The securing cover 4 is designed in such a way that, in the installed condition, there is at least a slight spacing between the inner surface 18 of the flange 7, which faces the axle stub 6, and the outer end 19 of the wheel nut 2, which faces the inner surface 18. The securing cover 4 can be fitted by simple means, either by hand or using an appropriate tool.

FIG. 2 shows the securing cover 4 in isolation. Adjoining the cylindrical flange region 7 is the cylindrical extension 10, which extends from the flange region 7 in the direction of the axle stub. The cylindrical extension 10 is divided substantially into three regions, wherein the first region is defined by the thread-free outer surface 11 acting as a stabilizing surface, the second region is defined by the external thread 8, and the third region is defined by the contact region 15, which is provided with a smaller diameter than the stabilizing surface. Also visible is the recess 13 for the sealing element. In the flange region 7, the securing cover 4 can have a plurality of engagement openings, in which corresponding engagement tools can engage to facilitate fitting.

What is claimed:

1. A device for securing a wheel nut on a wheel hub of a motor vehicle, wherein the device is a securing cover comprising:
    cylindrical flange region that rests at least over an end of a hollow axle stub,
    a cylindrical extension, which extends from the flange region in a direction of the hollow axle stub, the cylindrical extension is provided with an external thread and interacts with an internal thread arranged in the hollow axle stub of the wheel hub, and
    at least one sealing element, which is arranged in a corresponding recess, is provided on the circumferential surface of the cylindrical extension, and the sealing element creates a seal between the device and a bearing surface on the inner surface of the hollow axle stub,
    wherein an inside diameter of the bearing surface is greater than an outside diameter of a contact region of the cylindrical extension at a location adjacent the sealing element.

2. The device as claimed in claim 1, wherein at least one thread-free outer surface extends on the cylindrical extension and interacts with a thread-free inner surface of the hollow axle stub.

3. The device as claimed in claim 2, wherein a connecting arrangement is formed between the thread-free outer surface of the extension and the thread-free inner surface of the axle stub.

4. The device as claimed in claim 2, wherein the thread-free outer surface is an uninterrupted circumferential surface.

5. The device as claimed in claim 1, wherein the sealing element is an O-ring.

6. The device as claimed in claim 2, wherein the sealing element is arranged in a contact region of smaller diameter than a diameter of the thread-free outer surface.

7. The device as claimed in claim 1, wherein the bearing surface stabilizes the contact region.

8. The device as claimed in claim 1, wherein, in an installed condition, there is a spacing between an inner surface of the flange region, which faces the axle stub, and an outer end of the wheel nut, which faces the inner surface of the flange region.

9. The device as claimed in claim 1, wherein the wheel nut is a wheel nut of a center lock on a motor vehicle wheel.

* * * * *